Dec. 17, 1957 G. L. MEYERS 2,816,853
METHOD OF FORMING PLASTIC PROTUBERANCES
Filed Feb. 1, 1954 2 Sheets-Sheet 1

INVENTOR.
GEORGE L. MEYERS
BY
Oberlin & Limbach
ATTORNEYS.

Dec. 17, 1957 G. L. MEYERS 2,816,853
METHOD OF FORMING PLASTIC PROTUBERANCES
Filed Feb. 1, 1954 2 Sheets-Sheet 2

INVENTOR.
GEORGE L. MEYERS
BY
Oberlin & Limbach
ATTORNEYS.

United States Patent Office 2,816,853
Patented Dec. 17, 1957

2,816,853

METHOD OF FORMING PLASTIC PROTUBERANCES

George L. Meyers, Willoughby, Ohio, assignor to The Eagle-Picher Company, Cincinnati, Ohio, a corporation of Ohio Application February 1, 1954, Serial No. 407,351

12 Claims. (Cl. 154—106)

This invention relates as indicated to composite sheet material, and more particularly to perforated sheet material having plastic or other materials intruded or molded in such perforations and ordinarily protruding therefrom.

Certain types of thin sheet material such as steel and aluminum strip, for example, and also certain fiber sheet materials are adapted for perforation in a wide variety of precisely defined patterns and at high rates of speed by machines now commercially available for such purpose. In the automotive field, certain articles such as floor mats have been conventionally molded of rubber although it has been appreciated that mats of certain plastics such as the vinyl plastics would be more decorative as well as longer wearing. Rubber has maintained its place in the field, however, due to its considerably lower cost. It is an object of my invention to provide perforated sheet material such as thin aluminum sheet having plastic materials such as the vinyl plastics protruding through such perforations to form a raised, decorative, wear-resistant surface while utilizing a minimum of such relatively more expensive plastic materials. A non-skid surface is, of course, thereby obtained which renders my new material very satisfactory for employment as floor mats, stair treads, automotive door sills and the like.

It is a further object of my invention to provide similar composite sheet material wherein appropriate pile materials are secured in the apertures of the apertured sheet material and project therefrom.

Still another object is to provide methods for the continuous or semi-continuous manufacture of composite sheet materials of the general type indicated.

A still further object is to provide such composite article having a thin backing layer of supporting sheet material adapted to protrude into the apertures of the apertured sheet and partially displace the plastic material therein.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawings:

Fig. 1 is a diagrammatic showing of one method for the continuous production of composite sheet material in accordance with my invention;

Fig. 2 diagrammatically illustrates a semi-continuous method for the manufacture of such composite sheet material;

Figure 1:
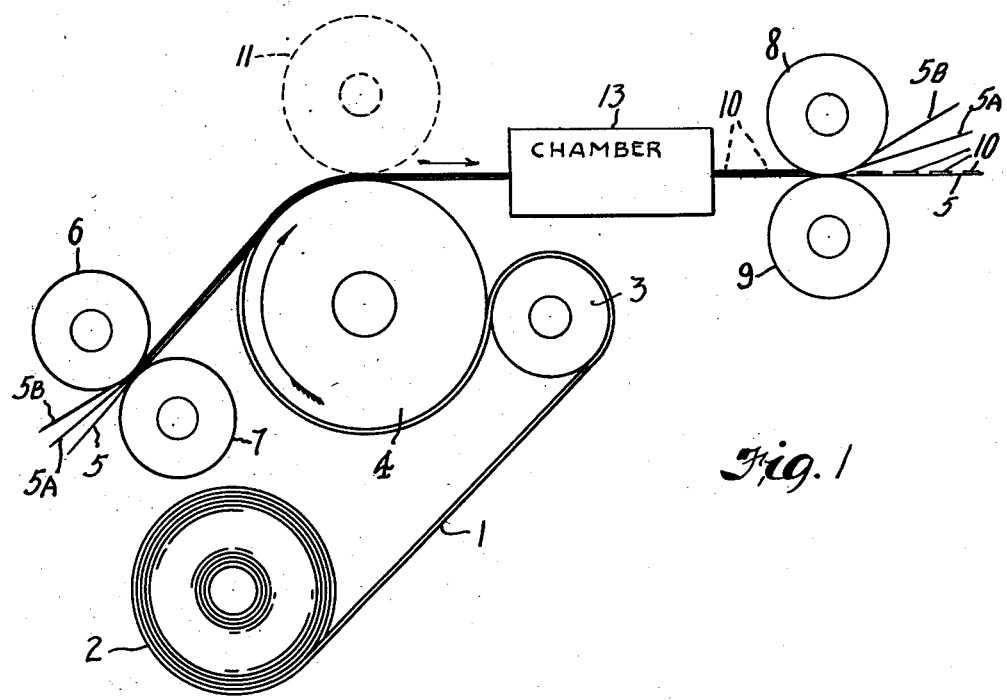

Now referring more particularly to said drawing and especially Fig. 1 thereof, a continuous strip of plastic material 1 may be unwound from a reel 2 thereof and passed around guide roll 3 before being wrapped closely about large heated roller 4. Two thin perforated metal strips 5 and 5A with a thin imperforate strip 5B superimposed thereon travel between friction rollers 6 and 7 which serve to maintain back tension, such strips 5, 5A, and 5B, being pulled over the heated roll or drum 4 by means of traction rolls 8 and 9. In some cases a simple gripping device may be substituted for rolls 8 and 9 to be employed in conjunction with a conventional draw bench. In the latter event, the length of composite strip produced in a single operation will be limited to the length of the draw bench.

Figure 3:
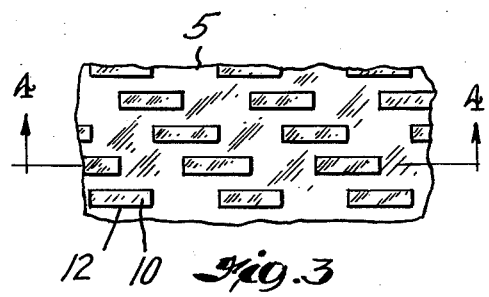
Fig. 3 shows a fragment of typical composite sheet material in accordance with my invention, in top plan.
Figure 4:
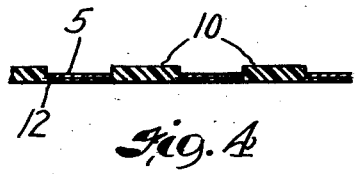
Fig. 4 is a transverse section taken on the line 4—4 on Fig. 3.

As the perforated strips are wrapped on a substantial arc about drum 4, the heated and softened plastic material 1 is forced through the apertures therein to form the upstanding projections or protuberances 10. A roll 11 may optionally be mounted for adjustment toward and away from drum 4 to bear against strip 5B if so desired or under some circumstances imperforate strip 5B may be dispensed with and such roll relied on to press and form the tops of the plastic protuberances intruded into the registered perforations of the superimposed perforate strips. Substantially all of the plastic material of strip 1 may thus be forced into the apertures 12 in strips 5 and 5A but a thin skin of plastic will usually be left on the underside thereof. For relatively high speed continuous production, the composite strip will be conducted through a cooling or curling chamber 13 (depending on the type of plastic material employed) to set or harden the plastic protuberances 10, and the perforate strip 5A and the imperforate strip 5B will be removed to leave the composite article of Figs. 3 and 4.

Figure 5:
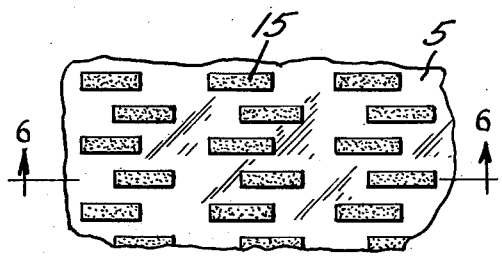
Fig. 5 is a fragmentary top plan view of another form of composite sheet material in accordance with my invention.
Figure 6:
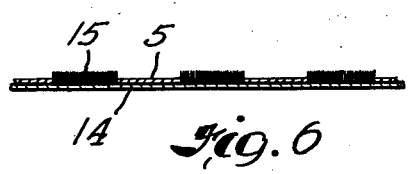
Fig. 6 is a transverse section taken on the line 6—6 on Fig. 5.

A somewhat similar product may be produced utilizing apparatus generally similar to that shown in Fig. 1, as illustrated in Figs. 5 and 6 of the drawing. Here, instead of the strip of plastic 1, a continuous backing strip 14 of paper, fiber, fabric, sheet metal or the like is employed and its outer surface coated with cement prior to application of the perforated strip 5 thereto (strips 5A and 5B are not employed). Flocking material 15 is then distributed over the apertured surface, ordinarily with a degree of vibration, and bonded to the cement exposed in such apertures to form upstanding projecting areas as best shown in Figs. 5 and 6 of the drawing. It will be appreciated that the perforated strip 5 may be of highly polished aluminum, for example, and the pile material 15 of various selected colors. An endless selection of perforation shapes is likewise available.

Figure 2:
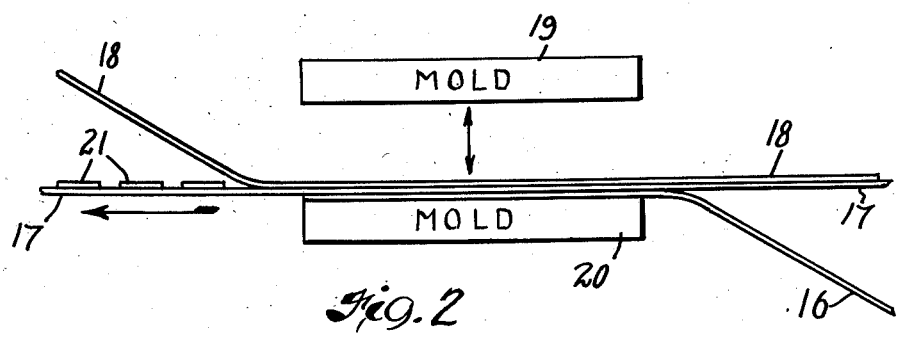
Figure 7:
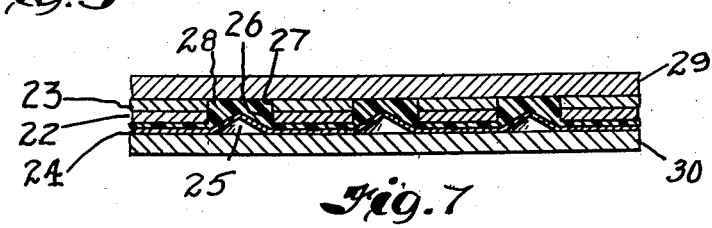
Fig. 7 is a transverse section illustrating a modified form of molding operation whereby plastic protuberances of very sharply defined conformation may be produced, with a portion of the plastic material being displaced by the backing sheet.
Figure 8:
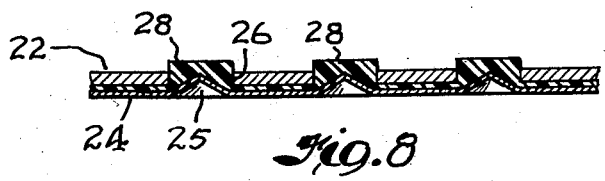
Fig. 8 is a transverse section through the product of the Fig. 7 operation.

Now referring more particularly to Figs. 2, 7 and 8, composite sheet material in accordance with my invention may also be produced in a semi-continuous manner by superimposing a strip of suitable plastic material 16, a thin perforated strip 17 of aluminum or the like, and an upper strip 18 of aluminum or the like having perforations therein exactly similar to those in strip 17 and registered therewith. This assembly of superimposed strips is introduced between suitable mold platens 19 and 20, as diagrammatically shown in Fig. 2, and pressure applied to intrude the plastic into such registered apertures. Such mold platens will, of course, be heated if the material of strip 16 is a thermoplastic or thermosetting resin. The plastic material is then cooled or cured as necessary to set or harden the same and the mold platens are separated and the assembled strips advanced (to the left as viewed in Fig. 2). The upper strip 18 may then be separated from strip 17 to expose the plastic protuberances 21 formed in the apertures in strip 18. This method has the advantage of forming very precisely shaped plastic protuberances especially when such upper strip 18 is relatively thin. Fairly thick protuberances may be formed when employing this method if a slight upward taper is provided in the apertures in strip 18 to facilitate peeling of strip 18 from the assembly without damage to the protuberances.

As shown in Fig. 7, thin plates or strips 22 and 23 corresponding to strips 17 and 18 may also be employed in conjunction with a thin base strip 24 having indentations or bulges 25 corresponding in location to the registered apertures 26 and 27 in such respective strips 22 and 23 but of somewhat less extent. The plastic material 28 interposed between strips 22 and 24 is forced into such apertures through pressure imposed on platens 29 and 30 to fill the same in a manner similar to that above explained in connection with the Fig. 2 process and after cooling or curing such platens together with strip or plate 23 may then be removed to leave the composite article shown in Fig. 8 and comprising the perforated strip 22, sharply defined plastic protuberances 29, and the base sheet 24 with the indentations or bulges 25 of the latter occupying a portion of the space which would otherwise be filled by the plastic material forming such protuberances 28. Ordinarily a thin layer of the plastic material will also remain between strip 22 and backing sheet 24 although when the apertures 26 are relatively closely spaced and heavy pressures are imposed, such plastic may be substantially entirely displaced into the regions defined by the registered apertures 26 and 27 to form such protuberances. The new composite sheet material illustrated in Fig. 8 is relatively strong due to the employment of backing 24 even when perforated strip 22 is of very thin gauge. There is furthermore an economy in the use of the relatively expensive plastic material forming the protuberances, especially when the latter are of relatively large size.

Sheet materials suitable for perforation and employment in accordance with my invention include metal sheets or strips such as steel, aluminum, galvanized steel, anodized aluminum, stainless steel, and brass. Vulcanized fiber, colored kraft papers, and paper and metal foils such as tinfoil and aluminum foil may also be used. Sheet thicknesses may ordinarily range from about two thousandths of an inch to one-sixteenth inch although punch press perforated sheets as thick as one-fourth inch may sometimes be employed. Certain fairly rigid plastic sheet materials such as the vinyl plastics (polyvinyl chloride, polyvinyl acetate, and co-polymers of the same) may likewise be perforated for use as the base through which other plastics may be extruded.

Such vinyl plastics may also be used to form the protuberances, usually in association with perforated metal sheets, and thermoplastics are ordinarily preferred since the heating and cooling cycle is more rapid than most curing operations. Examples of suitable thermoplastics include the following:

Cellulosic:
    Cellulose acetate: Lumarith (Celanese), Tenite I (Tennessee Eastman)
    Regenerated cellulose: Cellophane (du Pont)
    Cellulose acetate butyrate: Tenite II (Tennessee Eastman)
    Cellulose nitrate: Pyralin (du Pont), Nitron (Monsanto)
    Ethyl cellulose: Ethocel (Dow), Celcon (Celanese)

Vinyl polymers and copolymers:
    Polyvinyl chloride: Geon (B. F. Goodrich), Vinylite (Bakelite Corp.)
    Vinyl chloride-acetate copolymers: Vinylite
    Vinyl chloride-vinylidine chloride copolymers: Geon, Plioflex (Goodyear)
    Vinyl alcohol: Elvanol
    Vinyl butyral: Vinylite (Bakelite Corp.), Butacite (du Pont), Saflex (Monsanto)
    Vinyl acetate: Elvacet (du Pont), Vinylite (Bakelite)

Vinylidene chloride resins: Saran (Dow)
Polyethylene
Styrene polymers and co-polymers: Polystyrene: Styron (Dow), Polystyrene (Bakelite), Lustron (Monsanto), Textolite (G. E.)
Polyamide resins: Nylon (du Pont)
Rubber hydrochloride: Pliofilm (Goodyear), Pliolite (Goodrich), Parlon (Hercules Powder Co.)
Acrylic resins: Lucite (du Pont), Plexiglas (Rohm & Haas)

Examples of thermosetting resins include phenolic resins such as the phenol-formaldehyde resins Bakelite (Bakelite Corp.) and Durez (Durez Plastics Corp.), melamine resins such as the melamine-formaldehyde resins Melmac (American Cyanamid) and Plaskon (Plaskon Corp.), and the polyester resins such as Bakelite Polyester Resins (Bakelite Corp.) and Thalid (Monsanto).

Examples of suitable synthetic rubbers include polychloroprene such as neoprene (du Pont), butadiene-acrylonitrile copolymers such as Butaprene and Hycar, isobutylene-diolefin copolymers ("Butyl"), and the butadiene-styrene copolymers (GR-S).

In forming the pile article, flocking material of wood, rayon, or nylon, for example, may be employed, ordinarily being secured in the apertures by a synthetic rubber base cement such as EC711 obtainable from Minnesota Mining and Manufacturing Co. Another suitable cement is a latex cement Z22 produced by General Latex and Chemical Corp. Such cements serve the dual purpose of adhering the flock and also bonding the perforated sheet to the backing sheet.

When using the Fig. 2 or Fig. 7 methods of molding, the protuberances will usually project a distance above the perforated sheet a distance equal to the thickness of such sheet (i. e., sheets 17 and 18, or sheets 22 and 23 will usually be of the same thickness). This is not necessarily the case, however, as the registering sheet which is stripped away may be of a different thickness. Registration of the superimposed perforated sheets may be ensured by perforating the same simultaneously in such superimposed relationship, if desired. It is generally preferred that a thin layer of the plastic be left under the perforated sheet (Figs. 4 and 8) to assist in anchoring the protuberances. A backing coating of cement or plastic may also be sprayed on or otherwise applied for this purpose.

The finished articles are suitable for a wide variety of uses including internal and external automotive trim, floor mats, floor mat inserts, sill mats, scuff plates, stair treads, dash panels and wall panels. A certain degree of sound-deadening effect is obtainable and may be improved by punching apertures in the composite material intermediate the protuberances. Such latter form is also useful for radio grills. The plastic forced into the apertures may be formed flush with the face of the perforated strip by use of an imperforate mold face opposed thereto. Due to the fact that the composite sheet material may be of unusually thin gauge it may be exceptionally flexible and capable of being conformed to a wide variety of shapes.

Other modes of applying the principle of the invention may be employed, change being made as regards the details described, provided the features stated in any of the following claims or the equivalent of such be employed.

I therefore particularly point out and distinctly claim as my invention:

1. The method of forming composite sheet material which comprises passing a strip of thermoplastic material about a portion of the periphery of a rotatable drum, heating such drum to soften such thermoplastic material, passing two superimposed perforated metal strips about such drum and superimposed upon such thermoplastic material, with a third imperforate strip on such perforated strips, the perforations of the latter being in register, tensioning such metal strips to press the same against such softened thermoplastic material on such drum to force such thermoplastic material into such perforations, such strip of thermoplastic material being appreciably thicker than said two perforated metal strips, cooling such thermoplastic, and removing such imperforate and uppermost perforate strips to expose upstanding plastic protuberances projecting above the remaining perforate sheet.

2. The method of claim 1, with the additional step of applying rolling pressure on the sheet assembly while thus tensioning the same.

3. The method of forming composite sheet material which comprises passing a strip of thermoplastic material about a portion of the periphery of a rotatable drum, heating such drum to soften such thermoplastic material, perforating two strips of self-sustaining sheet material, passing such latter strips about such drum and superimposed one on the other and upon such thermoplastic material, tensioning such perforated strips to press the same against such softened thermoplastic material on such drum to force such thermoplastic material into such perforations, with a portion of such thermoplastic strip remaining to form a thin substantially continuous layer beneath the adjacent perforated strip, cooling such thermoplastic material, and removing the other perforated strip.

4. The method of claim 3, in which the thickness of such strip of thermoplastic material and the pressure exerted thereagainst by such perforated strips are sufficient to force such thermoplastic into such perforations to form upstanding protuberances projecting substantially beyond the surface of the adjacent perforated strip when the other perforated strip has been removed.

5. The method of forming composite sheet material which comprises passing a strip of thermoplastic material about a portion of the periphery of a rotatable drum, heating such drum to soften such thermoplastic material, perforating two strips of self-sustaining sheet material, passing such latter strips about such drum and superimposed upon each other and such thermoplastic material, tensioning such perforated strips to press the same against such softened thermoplastic material on such drum to force such thermoplastic material into such perforations, with a portion of such thermoplastic strip remaining to form a thin substantially continuous layer beneath such perforated strip, the strip of such thermoplastic being of sufficient thickness and the pressure exerted thereagainst by such perforated strips being sufficiently forceful to cause such thermoplastic to extrude through such perforations and form upstanding protuberances projecting substantially beyond the surface of the adjacent perforated strip, pressing on such protuberances further to shape the same, cooling such thermoplastic, and removing the uppermost perforated strip to expose such protuberances.

6. The method of forming composite sheet material which comprises passing a strip of soft plastic material about a portion of the periphery of a rotatably mounted roller, passing two superimposed perforated strips of self-sustaining sheet material about such roller and superimposed upon such soft plastic, tensioning such perforated strips to press the same against such soft plastic on such roller to force such plastic into such perforations, with a portion of such plastic continuing to form a thin substantially continuous layer beneath such perforated strip, then treating such plastic to set the same, and removing the outermost perforated strip.

7. The method of forming composite sheet material which comprises passing a strip of soft plastic material about a portion of the periphery of a rotatably mounted roller, passing superimposed perforated strips of self-sustaining sheet material about such roller and superimposed upon such soft plastic, tensioning such perforated strips to press the same against such soft plastic on such roller to force such plastic into such perforations, then treating such plastic to set the same, and removing the outermost perforated strip.

8. The method of forming composite sheet material which comprises passing a strip of soft plastic material about a portion of the periphery of a rotatably mounted roller, passing two superimposed perforated strips of self-sustaining sheet material about such roller and superimposed upon such soft plastic, tensioning such perforated strips to press the same against such soft plastic on such roller to force such plastic into such perforations and therethrough to form upstanding protuberances projecting beyond the surface of the adjacent perforated strip, treating such plastic to set the same, and removing the outermost perforated strip to expose such protuberances.

9. The method of forming composite sheet material which comprises superimposing two sheets of perforated material upon a sheet of deformable plastic material, the perforations of such respective perforated sheets being aligned with each other, applying pressure to force such plastic material into such perforations to fill the same, and stripping the outermost of such perforated sheets to expose plastic protuberances projecting beyond the surface of the other perforated sheet, such protuberances having substantially straight sides of a height equal to the thickness of the perforated sheet removed.

10. The method of claim 9, wherein a portion of such plastic material continues to form a substantially continuous sheet interconnecting the material in the perforations the adjacent perforated sheet.

11. The method of forming composite sheet material which comprises superimposing two sheets of perforated material upon a sheet of deformable plastic material, the perforations of such respective perforated sheets being aligned with each other, placing the resultant assembly between press surfaces, applying pressure thereby to force such plastic material into such perforations to fill the same, hardening such plastic, and then stripping the outermost of such perforated sheets to expose plastic protuberances projecting beyond the surface of the other perforated sheet, such protuberances having substantially straight sides of a height equal to the thickness of the perforated sheet removed.

12. The method of forming composite sheet material which comprises superimposing two sheets of perforated material upon a sheet of deformable plastic material, the perforations of such respective perforated sheets being aligned with each other, placing a backing sheet against the other side of such plastic sheet having protuberances thereon aligned with and projecting toward such apertures but of less lateral extent, placing the resultant assembly between press surfaces, applying pressure to force such plastic into such perforations to fill the same with such protuberances also entering such perforations, and stripping the outermost of such perforated sheets to expose plastic protuberances projecting beyond the surface of the remaining perforated sheet, such plastic protuberances having substantially straight sides of a height equal to the thickness of the perforated sheet removed, with such protuberances of such backing sheet serving as cores for such plastic protuberances.

References Cited in the file of this patent

UNITED STATES PATENTS

| | | |
|---|---|---|
| 1,292,705 | Cheney | Jan. 28, 1919 |
| 2,071,921 | Dickson | Feb. 23, 1937 |
| 2,290,238 | Hickok | July 21, 1942 |
| 2,355,949 | Boutwell | Aug. 15, 1944 |
| 2,361,682 | Grabec | Oct. 31, 1944 |
| 2,622,052 | Chandler | Dec. 16, 1952 |
| 2,680,698 | Schnee | June 8, 1954 |
| 2,688,581 | Stubbs | Sept. 7, 1954 |
| 2,715,089 | Michener et al. | Aug. 9, 1955 |